(12) United States Patent
Takeuchi et al.

(10) Patent No.: US 8,361,654 B2
(45) Date of Patent: Jan. 29, 2013

(54) PROCESS FOR PRODUCING METAL SULFIDE

(75) Inventors: Tomonari Takeuchi, Ikeda (JP); Hikari Sakaebe, Ikeda (JP); Tetsuo Sakai, Ikeda (JP); Kuniaki Tatsumi, Ikeda (JP)

(73) Assignee: Nat'l Institute of Advanced Industrial Science . . ., Tokyo (JP)

( * ) Notice: Subject to any disclaimer, the term of this patent is extended or adjusted under 35 U.S.C. 154(b) by 385 days.

(21) Appl. No.: 12/674,090

(22) PCT Filed: Aug. 11, 2008

(86) PCT No.: PCT/JP2008/064425
§ 371 (c)(1),
(2), (4) Date: Feb. 18, 2010

(87) PCT Pub. No.: WO2009/028326
PCT Pub. Date: Mar. 5, 2009

(65) Prior Publication Data
US 2011/0223481 A1 Sep. 15, 2011

(30) Foreign Application Priority Data

Aug. 24, 2007 (JP) .................. 2007-217815
Dec. 4, 2007 (JP) .................. 2007-313003
Dec. 26, 2007 (JP) .................. 2007-333490

(51) Int. Cl.
H01M 4/02 (2006.01)
H01M 4/58 (2010.01)

(52) U.S. Cl. ........ 429/209; 429/220; 429/221; 429/223; 423/561.1; 205/494

(58) Field of Classification Search .................. 429/209, 429/220, 221, 223; 423/561.1; 205/494
See application file for complete search history.

(56) References Cited

U.S. PATENT DOCUMENTS 1,502,213 A * 7/1924 Rodrian ............... 205/494
3,162,587 A * 12/1964 Zubryckyj ............ 205/494

FOREIGN PATENT DOCUMENTS

JP 1-317105 A 12/1989

OTHER PUBLICATIONS

K. Tezuka et al.; "Simple Synthesis of Copper and Silver Sulfides under Hydrothermal Condition"; 17th MRS-J Academic Symposium, Program and Abstracts, Dec. 8, 2006, p. 138, E-12-G.
J.Z. Jiang et al.; "Mechanochemical Synthesis of Fe-S Materials"; Journal of Solid State Chemistry, 1998, vol. 138, pp. 114-125.

(Continued)

*Primary Examiner* — Timothy Vanoy
(74) *Attorney, Agent, or Firm* — Westerman, Hattori, Daniels & Adrian, LLP

(57) ABSTRACT

The present invention provides a production process of a metal sulfide, which includes placing a metal component and sulfur in a conductive container, and applying a pulsed direct current to the container in a non-oxidizing atmosphere to cause the metal component to react with sulfur, and also provides a metal sulfide obtained by the process and represented by a composition formula: $MS_x$, wherein M is at least one member selected from the group consisting of Ni, Cu, Fe, and Co, and $1 < x \leqq 2$. The present invention is capable of easily producing a metal sulfide with a high proportion of sulfur atoms, which is expected to exhibit excellent properties as a positive-electrode active material for a high capacity lithium secondary battery.

9 Claims, 8 Drawing Sheets

OTHER PUBLICATIONS

Tomonari Takeuchi; "Preparation of Electric-Functional Ceramics by Spark-Plasma-Sintering Method"; Journal of High Temperature Society, Jul. 20, 2005, vol. 31, No. 4, pp. 186-192.

Sang-Cheol Han et al.; "Electrochemical properties of NiS as a cathode material for rechargeable lithium batteries prepared by mechanical alloying"; Journal of Alloys and Compounds, 2003, vol. 349, pp. 290-296.

Y. U. Jeong et al.; "Synthesis of Nickel Sulfides in Aqueous Solutions Using Sodium Dithionite"; Inorg. Chem, 2001 vol. 40, pp. 73-77.

Gunnar Brostigen et al.; "Redetermined Crystal Structure of FeS2 (Pyrite)"; Acta Chem. Scand., 1969, vol. 23, No. 6, pp. 2186-2188.

Robert A. Berner; "The Synthesis of Framboidal Pyrite"; Economic Geology, 1969, vol. 64, pp. 383-384.

J.Z. Jiang et al.; "Mechanochemical Synthesis of Fe-S Materials"; Journal of Solid State Chemistry, 1998, vol. 138, pp. 114-125 article No. SC987761.

Sigrid Furuseth et al.; "On the Magnetic Properties of CoSe2, NiS2, and NiSe2"; , Acta Chemica Scandinavica, 1969, vol. 23, pp. 2325-2334.

Ellen Nowack et al.; "Charge Densities in CoS2 and NiS2 (Pyrite Structure)"; Acta Crystallographica B, 1991, B47, pp. 650-659.

Tomonari Takeuchi et al.; "Preparation of NiS2 Using Spark-Plasma-Sintering Process and Its Electrochemical Properties"; Journal of the Electrochemical Society, 2008, vol. 155, No. 9, pp. A679-A684.

International Search Report of PCT/JP2008/064425, mailing date of Sep. 16, 2008.

* cited by examiner (a) EXAMPLE 1 (POROUS BODY)

(b) EXAMPLE 1 (AFTER BEING CRUSHED)

(c) EXAMPLE 2

PROCESS FOR PRODUCING METAL SULFIDE

TECHNICAL FIELD

The present invention relates to a production process of a metal sulfide, a metal sulfide obtained by the process, and its use.

BACKGROUND ART

The development of various devices and systems in recent years has increased the demand for higher performance batteries as a power source (primary battery, secondary battery, capacitor, etc.). For example, lithium secondary batteries are gaining widespread popularity as high energy density secondary batteries serving as the power source for electronic devices, such as portable communication devices, laptop computers, etc. Further, in terms of reducing environmental load, lithium secondary batteries are also expected to be used as batteries for driving the motors for vehicles. Accordingly, there is a demand for the development of high energy density lithium secondary batteries that will correspond to higher performance in the above devices. In order to meet this demand, increasing the capacities of both positive electrodes and negative electrodes is necessary.

However, the capacity of the positive electrode for currently available lithium secondary batteries has not increased as much as that of the negative electrode. For example, the specific capacity of lithium nickel oxide-based materials, which is said to be relatively high, is about 190 to 220 mAh/g. Even in the case of $Li_2MnO_3$ based materials, which contain a relatively larger amount of lithium per formula weight, their theoretical capacity based on the assumption that all of the lithium ions are used during charge and discharge, is merely about 460 mAh/g.

In contrast, although sulfur is a substance with a low operating potential, the theoretical capacity thereof is as high as about 1670 mAh/g. However, there are problems such as the fact that elemental sulfur has a low conductivity, and reacts with lithium ions during the discharge of a battery system including currently available organic electrolyte (for example, an electrolyte in which $LiPF_6$ at a concentration of 1 M is dissolved into a 1:1 mixed solution of ethylene carbonate and dimethyl carbonate), and thereby dissolves into the electrolyte. Using metal sulfides ($MS_x$; M represents a metal component such as nickel), which have a conductivity comparable to or higher than that of a semiconductor material and shows relatively low dissolution into the electrolyte compared to sulfur, is one approach to overcoming these problems. Because $MS_x$ reacts with two lithium atoms per sulfur atom during charge and discharge, the number of sulfur atoms per formula weight should be increased as much as possible in order to design a high capacity positive electrode. For example, when M represents nickel, the theoretical capacity of NiS, wherein x=1, is about 590 mAh/g, whereas the theoretical capacity of $NiS_2$, wherein x=2, is about 870 mAh/g.

However, because sulfur ignites in air at about 250° C., and its melting point is as low as about 120° C., controlling the composition of a product is difficult.

Accordingly, an extremely complicated process is employed as a process of producing a metal sulfide $MS_2$ with a high proportion of sulfur atoms. For example, a metal and a sulfide are reacted by conducting heat treatment for a long time while controlling sulfur vapor pressure in a reducing atmosphere. In order to complete the synthesis of the metal sulfide in a relatively short period of time, it is necessary to conduct the reaction in a stream of $H_2S$ or in a high-pressure gas atmosphere at a high-temperature.

However, the above-described processes require a prolonged heat treatment or a reaction that takes place in a high-pressure gas atmosphere. Further, Synthesis carried out using a stream of $H_2S$ requires exhaust gas treatment. Additionally, sulfide obtained by the process that uses a stream of $H_2S$ has poor crystalline quality. Accordingly, an easier production process is needed in order to promote the use of metal sulfide as a positive-electrode material for lithium secondary batteries.

Mechanical milling, precipitation reaction in liquid phase, etc., are known to be easier than the above-described processes. Of these, a production process using mechanical milling supplies less energy to a sample powder, as described, for example, in Non-Patent Document 1, compared to the thermal reaction process. However, although NiS, wherein x=1, can be easily produced by mechanical milling, $NiS_2$, wherein x=2, is difficult to produce. Further, as described, for example, in Non-Patent Document 2, although a production process using a precipitation reaction in liquid phase can produce crystalline $Ni_3S_2$ (x=2/3), $Ni_3S_4$ (x=4/3), etc., by adjusting the pH of a reaction solution, it is also difficult to produce $NiS_2$ (x=2) with this process.

Among the above-described metal sulfides, iron sulfide contains iron element, which is a relatively inexpensive metal, as a raw material. Thus, an iron sulfide with a high proportion of sulfur atoms is considered to be useful as a positive-electrode material that is inexpensive and has a high theoretical capacity.

The following process, for example, is known as an iron sulfide ($FeS_2$) production process that has a high proportion of sulfur: iron and sulfur are mixed in a molar ratio of 1:2, iodine is added thereto, and then the mixture is vacuum-sealed in a quartz tube and thermally reacted for about 5 days (see Non-Patent Document 3 below). The following process is also known: after an NaOH aqueous solution saturated with $H_2S$ is added to a mixture of $FeSO_4 \cdot 7H_2O$ and rhombic sulfur, $H_2S$ is passed therethrough, and the reaction system is closed and kept under heat for about 2 weeks (see Non-Patent Document 4 below).

Further, the following process is also known: iron powder and sulfur powder are mixed in a molar ratio of 1:2, and the mixture is placed in a tungsten carbide container and mixed in a ball mill for about 110 hours under an atmosphere filled with Argon gas, thus producing iron sulfide (see Non-Patent Document 5 below).

However, these processes have disadvantages that precise atmospheric control is required during production and the reaction time takes long time exceeding 100 hours in order to obtain intended iron sulfide.

As described above, an easy production process for a metal sulfide with a high proportion of sulfur atoms has not been established. Accordingly, the development of a technique for easily producing a metal sulfide $MS_x$ (x>1) is desired in order to promote the widespread use of a high capacity lithium battery that uses a sulfur-based positive electrode.

Non-Patent Document 1: S-C. Han, H-S. Kim, M-S. Song, P. S. Lee, J-Y. Lee, and H-J. Ahn, J. *Alloys Comp.*, 349, 290-296 (2003).

Non-Patent Document 2: Y. U. Jeong and A. Manthiram, *Inorg. Chem.*, 40, 73-77 (2001).

Non-Patent Document 3: G. Brostingen and A. Kjekshus, *Acta Chem. Scand.*, 23, 2186 (1969)

Non-Patent Document 4: R. A. Berner, *Econ. Geol.*, 64, 383 (1969)

Non-Patent Document 5: J. Z. Jiang, R. K. Larsen, R. Lin, S. Morup, I. Chorkendor., K. Nielsen, K. Hansen, and K. West, *J. Solid State Chem.*, 138, 114 (1998)

DISCLOSURE OF THE INVENTION

Technical Problem

The present invention is made in view of the above-described conventional technical problems, and its main object is to provide a process for easily producing a metal sulfide having a high proportion of sulfur atoms that is expected to exhibit excellent properties as a high capacity positive-electrode active material.

Technical Solution

The present inventors conducted intensive studies in an attempt to achieve the above-described object. As a result, the inventors found that even a metal sulfide with a high proportion of sulfur atoms can be efficiently produced in a relatively short period of time by using a metal component such as Ni, Cu, Fe, Co, etc., and sulfur as raw materials; placing these raw materials in a conductive container; and applying a pulsed direct current to the container to thermally react the raw materials. The present inventor found that, particularly when a metal component is Ni or Ni alloy, even a metal sulfide having a high proportion of sulfur atoms can be efficiently produced in a relatively short period of time by using porous metal as a raw material. The present invention is accomplished based on these findings.

In other words, the present invention provides the following production process of a metal sulfide, a metal sulfide obtained by the process, and its use.

1. A production process of a metal sulfide, comprising placing a metal component and sulfur in a conductive container, and applying a pulsed direct current to the container in a non-oxidizing atmosphere to cause the metal component to react with sulfur.
2. The production process of a metal sulfide according to Item 1 above, wherein the metal component is Ni, Cu, Fe, Co, or an alloy thereof.
3. The production process of a metal sulfide according to Item 1 or 2 above, wherein the metal component is a porous metal.
4. The production process of a metal sulfide according to Item 3 above, wherein the metal component is porous nickel or porous nickel alloy.
5. The production process of a metal sulfide according to any one of Items 1 to 4 above, wherein the temperature of the conductive container when a pulsed direct current is applied to the container is from 300° C. to 800° C.
6. A metal sulfide obtained by any one of the processes as defined in Items 1 to 5 above, and represented by a composition formula: $MS_x$, wherein M is at least one member selected from the group consisting of Ni, Cu, Fe, and Co, and $1 < x \leq 2$.
7. The metal sulfide according to Item 6 above, wherein the metal sulfide is a porous metal sulfide obtained using porous metal as a raw material.
8. A lithium secondary battery positive-electrode material comprising the metal sulfide according to Item 6 or 7 above.
9. A lithium secondary battery, comprising a lithium secondary battery positive-electrode material comprising the metal sulfide according to Item 6 or 7 above.

Hereinbelow, a production process of a metal sulfide of the present invention is described in detail.

Starting Material

The present invention uses a metal component and sulfur as raw materials.

Ni, Cu, Fe, Co, or an alloy thereof is particularly preferable as the metal component. The metal sulfide formed from any of these metal components and sulfur has a high theoretical capacity and a suitable conductivity as a positive-electrode material. Furthermore, such a metal sulfide is a material that is less likely to dissolve into the electrolyte compared to elemental sulfur, and has excellent properties as a positive-electrode active material for a lithium secondary battery.

A metal component and sulfur serving as raw materials can be efficiently reacted with each other according to the below-described production process of the present invention. Accordingly, the shape of the metal component as a raw material is not particularly limited. A metal component of any shape, for example, porous metal (such as a sponge-like metal), granular metal, powdered metal, fibrous metal, etc., may be used as a raw material. Among these, particularly when porous metal is used as a raw material, because of its good reactivity, a metal sulfide with less amount of impurities can be efficiently produced.

Particularly when the metal component is Ni or Ni alloy, even a metal sulfide with a high proportion of sulfur atoms can be efficiently produced in a relatively short period of time by using porous metal as a raw material.

The porous metal is preferably a porous body having a porosity of about 80% or higher. When a porous body having a high porosity is used as a raw material, the contact area of the metal with sulfur vapor is large during the reaction, promoting the sulfurization of the metal and allowing many sulfur atoms to be easily incorporated into the resulting metal sulfide. Thus, a sulfide with a high proportion of sulfur atoms can be easily produced. The upper limit of the porosity is not particularly limited; however, about 99% or below is normally preferable.

There is no particular limitation on the shape of porous metal; however, in order to allow a conductive network to be formed around the porous metal, which is contained in a conductive container, and to allow the porous metal to be uniformly heated, every piece of porous metal preferably, has a shape that allows an electrical connection to the conductive container at least at two portions. For example, even when the porous metal is in a powder or granular form, a conductive network can be formed in the conductive container by placing the porous metal in the container such that there is sufficient contact between each piece of porous metal. Particularly, when the porous metal has a plate-like shape that is substantially congruent with the cross-sectional shape of the conductive container, sufficient contact between the conductive container and the porous metal can be ensured. The use of porous metal having such a shape allows a conductive network to be sufficiently formed around the porous metal, which is placed in the container, thereby allowing the temperature distribution in the container to be uniform.

There is no particular limitation on the shape of sulfur used as a raw material; however, usually, it is preferable to use powdered sulfur having an average particle size of about 1 to 300 μm. Note that, in the present specification, the average particle size is the particle size at which the cumulative population in particle size distribution is 50% when the particle size distribution is measured by the dry-type laser diffraction and scattering method.

There is no particular limitation on the ratio of a metal component to sulfur; however, the present invention preferably uses sulfur in a molar ratio that is greater than the molar ratio of sulfur in an intended metal sulfide, because it is usually difficult to cause the entire amount of sulfur used as raw material to completely react with a porous metal. For example, in the case of the production of a metal sulfide ($MS_2$), using, as raw material, at least 2 moles of sulfur per mole of metal component is preferable. There is no particular upper limit on the proportion of sulfur. For example, about 100 moles of sulfur per mole of metal component can be used. Further, when the amount of sulfur contained in a metal sulfide produced by one reaction is small, the same reaction may be repeated by further adding sulfur to the product, thereby obtaining a metal sulfide with a high proportion of sulfur atoms. In the case of repeating the reaction, the metal sulfide produced by the first reaction may be used, as is, in the resulting shape, or the metal sulfide may be crushed and then used in second and subsequent reactions. When the metal sulfide is crushed, the size thereof is reduced, thus generally further improving its reactivity with sulfur, and $MS_2$ can be produced with a smaller amount of sulfur and fewer repetitions.

Production Process of Metal Sulfide

According to the production process of a metal sulfide of the present invention, raw materials comprising a porous metal and sulfur are placed in a conductive container, and a pulsed direct current is applied to the conductive container. Accordingly, the conductive container is heated by the joule heating, and the raw materials in the container are heated, thereby causing the reaction between the porous metal and sulfur, and resulting in the formation of a metal sulfide.

There is no limitation on the material of the conductive container. The material is acceptable insofar as it has a sufficient conductivity and a heat resistance that withstands the heating temperature when a pulsed direct current is applied to the container, is composed of components that do not produce any by-products by reacting with sulfur, and has sufficient strength. For example, carbon (such as graphite), tungsten carbide, and the like may be suitably used.

The reaction between a metal component and sulfur is carried out in a non-oxidizing atmosphere, for example, an inert gas atmosphere such as Ar, $N_2$, etc., or in a reducing atmosphere such as $H_2$. Accordingly, the risk of sulfur ignition can be eliminated.

When a container capable of providing sufficient hermetic sealing is used as a conductive container, a non-oxidizing atmosphere can be established inside the conductive container.

Further, the conductive container does not need to be completely hermetically sealed. Insofar as the conductive container can be closed to a degree that can prevent the leakage of evaporated sulfur, some gasses such as inert gas may be leaked out through the container. When a conductive container that is not completely hermetically sealed is used, the container may be placed in a reaction chamber wherein a non-oxidizing atmosphere, such as an inert gas atmosphere, a reducing atmosphere, etc., is established. Accordingly, it is possible to carry out the reaction between a metal component and sulfur in a non-oxidizing atmosphere. In this case, the leakage of the evaporated sulfur from the conductive container can be efficiently suppressed by, for example, establishing an inert gas atmosphere, a reducing atmosphere, etc., of 0.1 MPa or greater inside the reaction chamber.

As described above, the present invention employs a process in which raw materials comprising a metal component and sulfur are placed in a conductive container, and a pulsed direct current is applied to the container, thereby preventing the leakage of melted and evaporated sulfur from the container. Accordingly, the loss of sulfur due to evaporation is reduced and a metal sulfide with a high proportion of sulfur atoms can be efficiently produced.

FIG. 1 is a schematic view showing an example of an apparatus for electric current application treatment used in the production process of the metal sulfide of the present invention.

The apparatus 1 for electric current application treatment shown in FIG. 1 has a die (conductive container) 3 containing raw materials 2 and an up and down pair of spacers (cover members of the container) 4 and 5. The spacers (cover members) 4 and 5 are supported by punch electrodes 6 and 7, respectively, and pressed by the punch electrodes 6 and 7 at a pressure of, for example, about 1 MPa against the die 3. Accordingly, the conductive container comprising the die 3 and the spacers 4 and 5 becomes hermetically sealed, and is thereby capable of preventing the leakage of the evaporated sulfur during the thermal reaction.

The spacers (cover members) 4 and 5 are composed of conductive members, and a pulsed direct current generated from a pulse current supply 11 is supplied to the spacers (cover members) 4 and 5 and the die (conductive container) 3 via the punch electrodes 6 and 7. A current-carrying unit comprising the die 3, the spacers 4 and 5, and the punch electrodes 6 and 7 is placed in a water-cooled vacuum chamber 8, and the inside of the chamber is controlled to a predetermined non-oxidizing atmosphere by an atmosphere control mechanism 15. This enables the reaction to be carried out in a non-oxidizing atmosphere. Using the apparatus shown in FIG. 1, sulfur is volatized when the circumference of the sample is heated; however, because the top and bottom of the mold (conductive container) 3 are covered by the spacers (cover members) 4 and 5, the loss of sulfur to the outside of the mold due to evaporation is low, and the reaction proceeds efficiently.

A control unit 12 drives and controls a pressurizing mechanism 13, the pulse current supply 11, the atmosphere control mechanism 15, water cooling mechanisms 16 and 10, and a temperature measuring device 17. The control unit 12 is configured to drive the pressurizing mechanism 13 so that the punch electrodes 6 and 7 compress the spacers 4 and 5 with a predetermined amount of pressure.

There is no particular limitation on the method of placing raw materials comprising a metal component and sulfur in the conductive container; however, it is preferable to place the raw materials in the container as uniformly as possible in order to facilitate the uniform progress of the reaction.

Particularly, when a porous metal is used as a raw material, it is preferable to place it in the container in a manner such that conductivity is ensured between every piece of porous metal and the conductive container so that a conductive network is formed around the metal component.

According to the method of the present invention, a pulsed direct current is applied to the conductive container containing a metal component and sulfur, and the conductive container is consequently heated by the joule heating, thereby heating the raw materials. As a result, a portion of the sulfur (the melting point is about 120° C.), which is a raw material, is evaporated, and is attached to the metal sample surface where the reaction occurs, thereby producing a metal sulfide. The reaction proceeds while the evaporated sulfur is further attached to the sample surface. These processes occur sequentially, thereby resulting in the production of a desired metal sulfide.

The temperature of the conductive container heated by applying a pulsed direct current may be suitably selected according to the type and shape of the metal used as a raw material, the type of a product, and the like; however, it is usually about 300° C. to 800° C. At temperatures below 300° C., there are cases where the reaction between the metal and sulfur that are used as raw materials is insufficient; and at temperatures of 800° C. or higher, decomposition may occur due to elimination of sulfur from the product. Accordingly, these temperature ranges are not preferable. Heating at temperatures of about 400° C. to 700° C. is particularly preferable.

A pulsed ON-OFF direct current having a pulse width of about 2 to 3 milliseconds and a frequency of about 3 Hz to 300 Hz, for example, may be used as a pulse current applied for heating. The current value varies depending on the type and size of the conductive container; however, about 300A to 1000A is preferable when, for example, a graphite container having an inner diameter of 15 mm and an outer diameter of 30 mm is used. During the reaction, it is only necessary to control the current value or the input electric energy (Wh value) by increasing or decreasing the current value while monitoring the temperature of the conductive container so as to maintain a predetermined temperature.

The heating time by applying an electric current cannot be unconditionally defined because it varies depending on the amount of sample used and the reaction temperature; however, maintaining the temperature within the above-described heating temperature range for about 1 minute to 2 hours is sufficient.

The sample, which is treated at a predetermined temperature by applying an electric current, is cooled and then taken out from the conductive container. Thereby, a metal sulfide is obtained. Further, by simply crushing the obtained metal sulfide in a mortar or the like, powdered metal sulfide can be obtained. When the reaction is not fully completed or when the amount of sulfur in the product is insufficient, the above-described treatment by applying an electric current may be repeated again after adding sulfur to the obtained sample. When treating a large amount of raw materials, a large conductive container may be used to increase the scale of the above-described process.

Metal Sulfide

The production process of the present invention is capable of efficiently producing, in a relatively short period of time, a metal sulfide represented by a composition formula: $MS_x$, wherein M is at least one member selected from the group consisting of Ni, Cu, Fe, and Co, and $1<x\leq2$, which has a high theoretical capacity as a positive-electrode material for a lithium secondary battery. The obtained metal sulfide still has substantially the same shape as the metal component used as a raw material. For example, when a porous metal is used as a raw material, its shape is maintained, resulting in a porous metal sulfide having a porosity of about 80% or higher.

A metal sulfide obtained by the process of the present invention can be effectively used as a positive-electrode material for a lithium secondary battery. A lithium secondary battery that uses the metal sulfide can be produced by known techniques. Specifically, besides using the metal sulfide obtained by the process of the present invention as a positive-electrode material, a lithium secondary battery may use the following materials and be assembled in accordance with conventional procedures: a known material such as metal lithium, carbon-based material (activated carbon, graphite), etc., as a negative-electrode material; a known solution in which a lithium salt such as lithium perchlorate, $LiPF_6$, etc., is dissolved in a solvent such as ethylene carbonate, dimethyl carbonate, etc., as an electrolyte; and other known battery components.

Advantageous Effects of the Invention

The production process of a metal sulfide of the present invention requires neither a stream of $H_2S$ gas nor a high-pressure gas atmosphere. The production process does not require a prolonged heat treatment, either. Accordingly, the desired metal sulfide can be efficiently produced in a relatively short period of time.

The production process of the present invention is capable of relatively easily producing even a metal sulfide represented by the composition formula: $MS_2$ that has a high theoretical capacity as a positive-electrode material for a lithium secondary battery. Accordingly, the process of the present invention is a highly useful process, particularly as a production process of a positive-electrode material for a lithium secondary battery.

BEST MODE FOR CARRYING OUT THE INVENTION

Hereinbelow the present invention is described in detail, with reference to Examples and Comparative Examples. However, the present invention is not limited to these examples.

Example 1

A foamed nickel (with a thickness of about 1 mm) having a porosity of 95% was washed by being immersed in hydrochloric acid, processed into a disk shape having a diameter of about 15 mm, and placed in a cylindrical graphite mold (conductive container) having an inner diameter of 15 mm. Sulfur powder (average particle size is about 20 μm) was uniformly placed in the spaces above and below the foamed nickel so as to provide a molar ratio of Ni:S=1:40. The mold was set in the vacuum chamber 8 of the apparatus for electric current application treatment shown in FIG. 1, the pressure inside the chamber 8 was reduced to about 20 Pa, and then argon gas was introduced until atmospheric pressure was reached.

Next, the graphite mold (conductive container) 3 was sandwiched between the spacers 4 and 5, which serve as the covers of the mold, from the top and bottom, respectively, and the spacers 4 and 5 were pushed against the graphite mold 3 by the top and bottom punch electrodes 6 and 7 at a pressure of about 1.5 MPa. Consequently, the graphite mold (conductive container) 3 was hermetically sealed, and conductivity was provided between the electrodes 6 and 7 and the graphite mold (conductive container) 3.

After that, a pulse current of up to about 1000 A (ON-OFF direct current having a pulse width of 2.5 milliseconds and a frequency of 29 Hz) was applied to the graphite mold (conductive container) 3 via the electrodes 6 and 7.

The graphite mold was heated at a rate of about 10° C./minute, and reached 600° C. about 1 hour after the start of pulse current application. After maintaining the graphite mold at this temperature for about 10 minutes, the applied electric current was switched off and the pressure was released. Then, the graphite mold was allowed to cool naturally.

The graphite mold was cooled to room temperature, and then the sample was taken out from the mold. After confirming that the porous shape was maintained, the sample was placed again in the graphite mold, and the spaces above and below the sample were filled with the same amount of sulfur powder in the same manner as described above. The mold was treated at 600° C. by applying a pulse current again in the same manner as described above, and this operation was repeated three more times. Thereby, a dark gray porous body was obtained.

FIG. 2(a) is a scanning electron microscope (SEM) picture of a porous body obtained by the above-described process.

FIG. 2(a) clearly shows that a porous body having a pore size of 100 to several hundred μm was obtained. The porosity measured by the Archimedes method was 89%.

FIG. 2(b) is a scanning electron microscope (SEM) picture of powdered metal sulfide obtained by crushing the porous body obtained by the above-described process in a mortar. As is shown in FIG. 2(b), the resulting product is composed of a fine powder whose primary particle size is in the submicron range; these powders are partially aggregated, forming secondary particles of about several microns.

FIG. 3(a) shows particle size distribution of secondary particles measured by a dry particle-size distribution measuring system. FIG. 3(a) confirms that the distribution of the powder body has a peak around 10 μm, and that the average particle size (defined as the diameter at 50% cumulative population) is about 8.9 μm. The presence of aggregated coarse particles, which poses a problem when producing electrodes, was not observed.

FIG. 4(a) shows X-ray diffraction patterns of the powder. Although the X-ray diffraction patterns show a trace amount of $Ni_{0.96}S$ as impurities, all other diffraction peaks were indexed in a cubic unit cell of $$Pa\bar{3} \qquad \text{[Math 1]}$$

The lattice constant calculated from the peak position is: a=5.68881(8)Å. This result shows good consistency with the previously reported value of $NiS_2$ (a=5.6873(5)Å) (S. Furuseth and A. Kjekshus, *Acta Chemica Scandinavica*, 23, 2325-2334 (1969)).

Further, according to the results of a Rietveld analysis carried out using a Rietveld analysis program (RIETAN-2000: F. Izumi and T. Ikeda, *Mater. Sci. Forum*, 321-324, pp. 198-203 (2000)), the content of $Ni_{0.96}S$ impurities was calculated as a weight ratio of about 3%, which is an amount that hardly affects the charge-discharge test.

Galvanostatic charge/discharge tests were carried out in the cutoff voltage range of 1.0 V to 3.0 V at a current density of 174.6 mA/g (0.2 C) using the following materials: the obtained sample powder as a positive-electrode material for a lithium secondary battery; a lithium metal as a negative electrode; aluminum mesh as a current collector; and a solution in which $LiPF_6$ was dissolved into a mixed solution of ethylene carbonate and dimethyl carbonate as an electrolyte.

FIG. 5(a) shows the discharge curve of a lithium secondary battery at 0.2 C. The discharge capacity is about 850 mAh/g, which is about 97% of the theoretical capacity (about 870 mAh/g) of $NiS_2$. This indicates that a capacity that is almost as high as the theoretical capacity was obtained.

The above shows that the metal sulfide powder obtained by the production process of the present invention can be suitably used as a positive-electrode material for a high-capacity lithium secondary battery.

Example 2

A foamed nickel having a porosity of 95% (thickness is about 1 mm) was processed into a disk shape having a diameter of about 15 mm, and placed in a cylindrical graphite mold (conductive container) having an inner diameter of 15 mm. Sulfur powder (average particle size is about 20 μm) was uniformly placed in the space above the foamed nickel so as to provide a molar ratio of Ni:S=1:2. The combination in this ratio was defined as one unit, and 10 units were stacked in a layer, and the mold was set in the vacuum chamber 8 of the apparatus shown in FIG. 1. Then, the treatment by applying a pulse current was carried out exactly in the same manner as in Example 1.

After the treatment, the applied pulse current was switched off and the pressure was released. Then, the mold was allowed to cool naturally to room temperature. Thereafter, the sample was taken out from the mold, and was sufficiently crushed in a mortar. Then, sulfur powder in an amount of ½ of the weight of the sulfur powder initially used was further added to the sample, and mixed in a ball mill. This mixed powder was again placed in the graphite mold, and the treatment by applying a pulse current was carried out at 600° C. in the same manner as described above. Thereby, a dark gray powder was obtained.

FIG. 4(b) shows X-ray diffraction patterns of the obtained powder. The X-ray diffraction patterns show that the obtained sample is a single-phase of $NiS_2$. This is probably because, unlike Example 1, the crushed sample powder was used in the second treatment, the reaction fully progressed, thereby resulting in a single-phase sample free of impurities.

The lattice constant calculated from the peak position in X-ray diffraction patterns is: a=5.68829(5)Å. This result shows good consistency with the previously reported value of $NiS_2$ (a=5.6873(5)Å).

FIG. 2(c) is a scanning electron microscope (SEM) picture of a powder body obtained by the above-described process. FIG. 2(c) shows that the powder body is composed of fine powders whose primary particle size is in the submicron range, and that these powders are partially aggregated, forming secondary particles of about several microns.

FIG. 3(b) shows the particle size distribution of secondary particles measured by a dry particle-size distribution measuring system. FIG. 3(b) confirms that the distribution of the powder body has a peak around 10 μm, and that the average particle size (defined as the diameter at 50% cumulative population) is about 9.2 μm. The presence of aggregated coarse particles, which poses a problem when producing electrodes, was not observed.

Galvanostatic charge/discharge tests were carried out in the same manner as Example 1, in the cutoff voltage range of 1.0 V to 3.0 V at current densities of 34.9 mA/g (0.04 C) and 174.6 mA/g (0.2 C) using the obtained $NiS_2$ powder as a positive-electrode material for a lithium secondary battery.

FIGS. 5(b) and (c) show discharge curves of a lithium secondary battery at 0.04 C and 0.2 C, respectively. The discharge capacity is about 820 mAh/g in both cases, which accounts for about 94% of the theoretical capacity (about 870 mAh/g) of $NiS_2$. This indicates that a capacity that is almost as high as the theoretical capacity was obtained.

The above shows that the metal sulfide powder obtained by the production process of the present invention can be suitably used as a positive-electrode material for a high-capacity lithium secondary battery.

Comparative Example 1

Nickel sulfide was produced in the same manner as in Example 2 except that the treatment by applying a pulsed direct current was carried out in the atmospheric environment instead of establishing an argon gas atmosphere in the vacuum chamber 8.

The obtained nickel sulfide was a gray powder in which solidified clumps of several millimeters in diameter were mixed therein. This is probably because the sulfur ignited during the heat treatment in the air and dissipated from the mold, and the remaining nickel partially reacted with a small amount of sulfur powder, resulting in the formation of solidified clumps.

The above shows that it is difficult to produce a desired metal sulfide by applying a pulsed direct current in an oxidizing atmosphere such as air.

Example 3

Sponge-like metallic iron (produced by Junsei Chemical Co., Ltd.) (99.99% purity, with an average particle size of about 30 μm) and sulfur powder (with an average particle size of about 20 μm) were mixed to provide a molar ratio of Fe:S=1:2. This mixture was uniformly placed in a graphite mold having an inner diameter of 15 mm, and set in the vacuum chamber 8 of the apparatus shown in FIG. 1. Thereafter, the treatment by applying a pulse current was carried out exactly in the same manner as in Example 1.

The graphite mold was heated at a rate of about 10° C./minute, and reached 600° C. about 1 hour after the start of pulse current application. After maintaining the graphite mold at this temperature for about 10 minutes, applied electric current was switched off and the pressure was released. Then, the graphite mold was allowed to cool naturally.

The graphite mold was cooled to room temperature, and then the sample was taken out from the mold and crushed. The sample was further mixed with sulfur powder having a weight of about 80% of the weight of the sulfur powder initially used. Then the sample was placed in the graphite mold again, and the treatment by applying a pulse current was carried out at 600° C. in the same manner as described above. Thereby, a dark gray powder was obtained.

FIG. 6(*a*) shows X-ray diffraction patterns of the obtained powder. The X-ray diffraction patterns show that all of the diffraction peaks were indexed in a cubic unit cell of $$Pa\bar{3} \qquad \text{[Math 2]}$$

and that the obtained sample is a single-phase of $FeS_2$. The lattice constant calculated from the peak position is: a=5.41667(7)Å. This result shows good consistency with the previously reported value of $FeS_2$ (a=5.4179 Å) (G. Brostigen and A. Kjekshus, *Acta Chemica Scandinavica*, 23, 2186 (1969)).

Galvanostatic charge/discharge tests were carried out in the cutoff voltage range of 1.0 V to 3.0 V at a current density of 174.6 mA/g using the following materials: the obtained sample powder as a positive-electrode material for a lithium secondary battery; a lithium metal as a negative electrode; aluminum mesh as a current collector; and a solution in which $LiPF_6$ was dissolved into a mixed solution of ethylene carbonate and dimethyl carbonate as an electrolyte.

FIG. 7(*a*) shows a discharge curve of a lithium secondary battery. The discharge capacity is about 790 mAh/g, which is about 89% of the theoretical capacity (about 890 mAh/g) of $FeS_2$. This indicates that a capacity almost as high as the theoretical capacity was obtained.

The above results clearly demonstrate that the iron sulfide powder obtained by the production process of the present invention can be suitably used as a positive-electrode material for a high-capacity lithium secondary battery.

Example 4

Iron powder (with an average particle size of about 30 μm) was mixed with sulfur powder (with an average particle size of about 20 μm) so as to provide a molar ratio of Fe:S=1:2. The treatment by applying a pulse current was carried out at 600° C. in the same manner as in Example 3. The sample was taken out, and then it was further mixed with sulfur powder having a weight of about 80% of the weight of the sulfur powder initially used. The treatment by applying a pulse current was again carried out at 600° C. in the same manner as described above. Thereby, a dark gray powder was obtained.

FIG. 6(*b*) shows X-ray diffraction patterns of the obtained powder. Although the X-ray diffraction patterns show a trace amount of unidentified impurities, all other diffraction peaks were attributable to $FeS_2$. Unlike Example 3, a trace amount of impurities remained probably because the raw materials were in the powder form, and thus the specific surface area was small compared to a sponge-like sample and consequently the area where iron powder reacted with sulfur was small. The lattice constant calculated from the peak position in X-ray diffraction patterns is: a=5.41992(11)Å. This shows good consistency with the previously reported value of $FeS_2$ (a=5.4179 Å).

Galvanostatic charge/discharge tests were carried out in the same manner as Example 3 at current densities of 174.6 mA/g, using the obtained $FeS_2$ powder as a positive-electrode material for a lithium secondary battery.

FIG. 7(*b*) shows a discharge curve of a lithium secondary battery. The discharge capacity is about 740 mAh/g, which is about 83% of the theoretical capacity (about 890 mAh/g) of $FeS_2$. This indicates that a capacity almost as high as the theoretical capacity was obtained. The reason why the discharge capacity was slightly low compared to Example 3 is probably due to contamination of a trace amount of unidentified impurities.

The above shows that the iron sulfide powder obtained by the production process of the present invention can be suitably used as a positive-electrode material for a high-capacity lithium secondary battery.

Example 5

Sponge-like metal cobalt (produced by Junsei Chemical Co., Ltd.) (purity is 99.99%) and sulfur powder (with an average particle size of about 20 μm) were mixed so as to provide a molar ratio of Co:S=1:2. This mixture was uniformly placed in a graphite mold having an inner diameter of 15 mm, and the mold was set in the vacuum chamber 8 of the apparatus shown in FIG. 1. Thereafter the treatment by applying a pulse current was carried out exactly in the same manner as in Example 1.

The graphite mold was heated at a rate of about 10° C./minute, and reached 550° C. about 55 minutes after the start of pulse current application. After the graphite mold was maintained at this temperature for about 10 minutes, the applied electric current was switched off and the pressure was released. Then, the graphite mold was allowed to cool naturally.

The graphite mold was cooled to room temperature, and then the sample was taken out from the mold and crushed. The sample was further mixed with sulfur powder in a weight of about half the weight of the sulfur powder used initially. Then, the sample was again placed in the graphite mold, and the treatment by applying a pulse current was carried out at 550° C. in the same manner as described above. This was repeated 4 times, and a dark gray powder was thereby obtained.

FIG. 8 shows X-ray diffraction patterns of the obtained powder. Although the X-ray diffraction patterns show a trace amount of $Co_3S_4$ as impurities, all other diffraction peaks were indexed in a cubic unit cell of $$a\bar{3} \qquad \text{[Math 3]}$$

The lattice constant calculated from the peak position is: a=5.53549(6)Å. This shows good consistency with the previously reported value of $CoS_2$ (a=5.5385(2)Å) (E. Nowack, D. Schwarzenbach, and T. Hahn, *Acta Crystallographica B*, 47, 650 (1991)). Further, according to the results of Rietveld analysis carried out using a Rietveld analysis program (RIETAN-2000: F. Izumi and T. Ikeda, *Mater. Sci. Forum*, 321-324, pp. 198-203 (2000)), the content of impurity $Co_3S_4$ was calculated to be 0.1% or less in the weight ratio, which is an amount that hardly affects the charge-discharge test.

Galvanostatic charge/discharge tests were carried out in the cutoff voltage range of 1.0 V to 3.0 V at a current density of 174.2 mA/g using the following materials: the obtained sample powder as a positive-electrode material for a lithium secondary battery; a lithium metal as a negative electrode; aluminum mesh as a current collector; and a solution in which $LiPF_6$ was dissolved into a mixed solution of ethylene carbonate and dimethyl carbonate as an electrolyte.

FIG. 9 shows a discharge curve of a lithium secondary battery. The discharge capacity is about 860 mAh/g, which is about 99% of the theoretical capacity (about 870 mAh/g) of $CoS_2$. This indicates that a capacity almost as high as the theoretical capacity was obtained.

The above shows that the cobalt sulfide powder obtained by the production process of the present invention can be suitably used as a positive-electrode material for a high-capacity lithium secondary battery.

EXPLANATION OF THE REFERENCE NUMERALS

Figure 1:
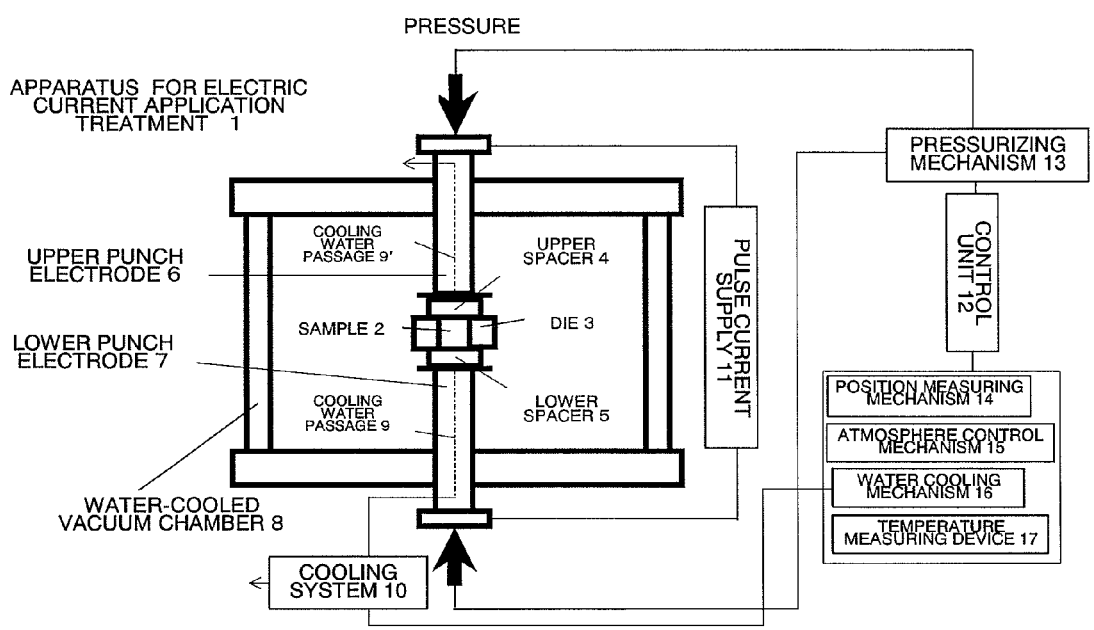
FIG. 1 shows a schematic view of an example of an apparatus for electric current application treatment used in the process of the present invention.
Figure 2:
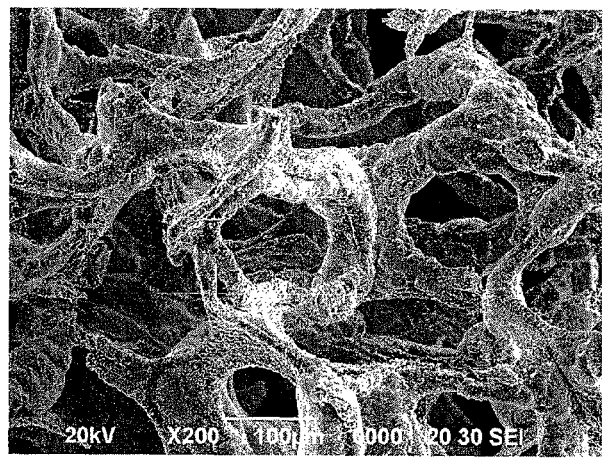
FIG. 2(*a*) to (*c*) show scanning electron microscope (SEM) pictures of the $NiS_2$ porous body produced in Example 1, powder obtained by crushing the porous body, and $NiS_2$ powder produced in Example 2.
Figure 2:
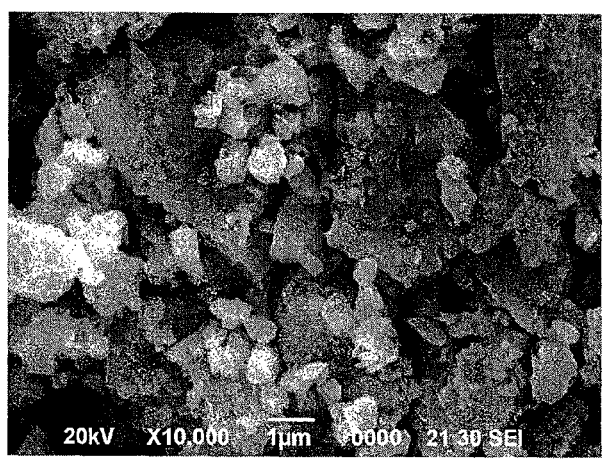
Figure 2:
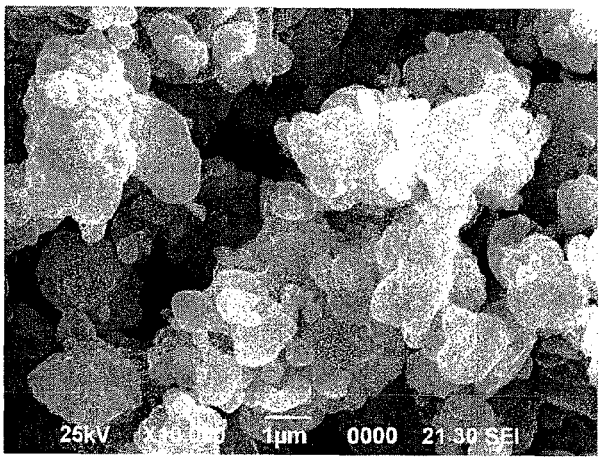
Figure 3:
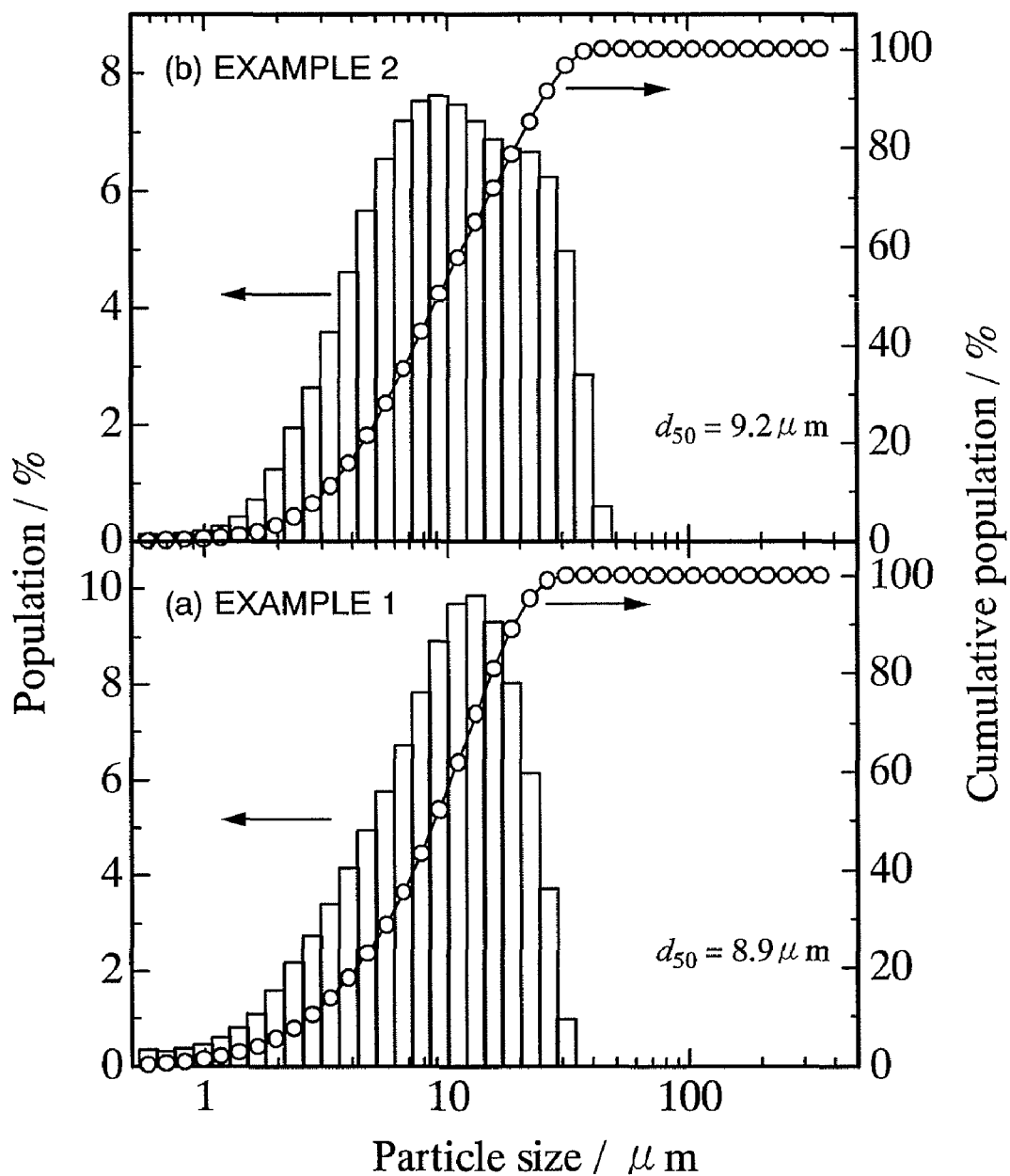
FIG. 3 shows graphs of the particle size distribution of the $NiS_2$ produced in Example 1 and Example 2.
Figure 4:
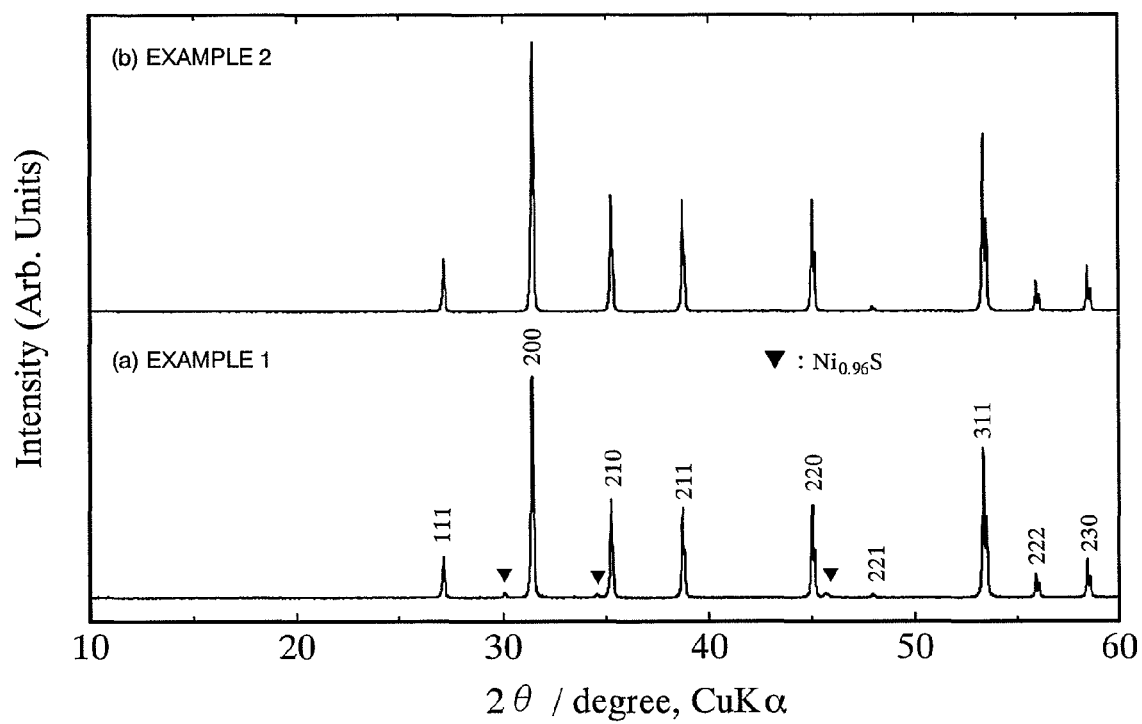
FIG. 4 shows X-ray diffraction patterns of the metal sulfides produced in Example 1 and Example 2.
Figure 5:
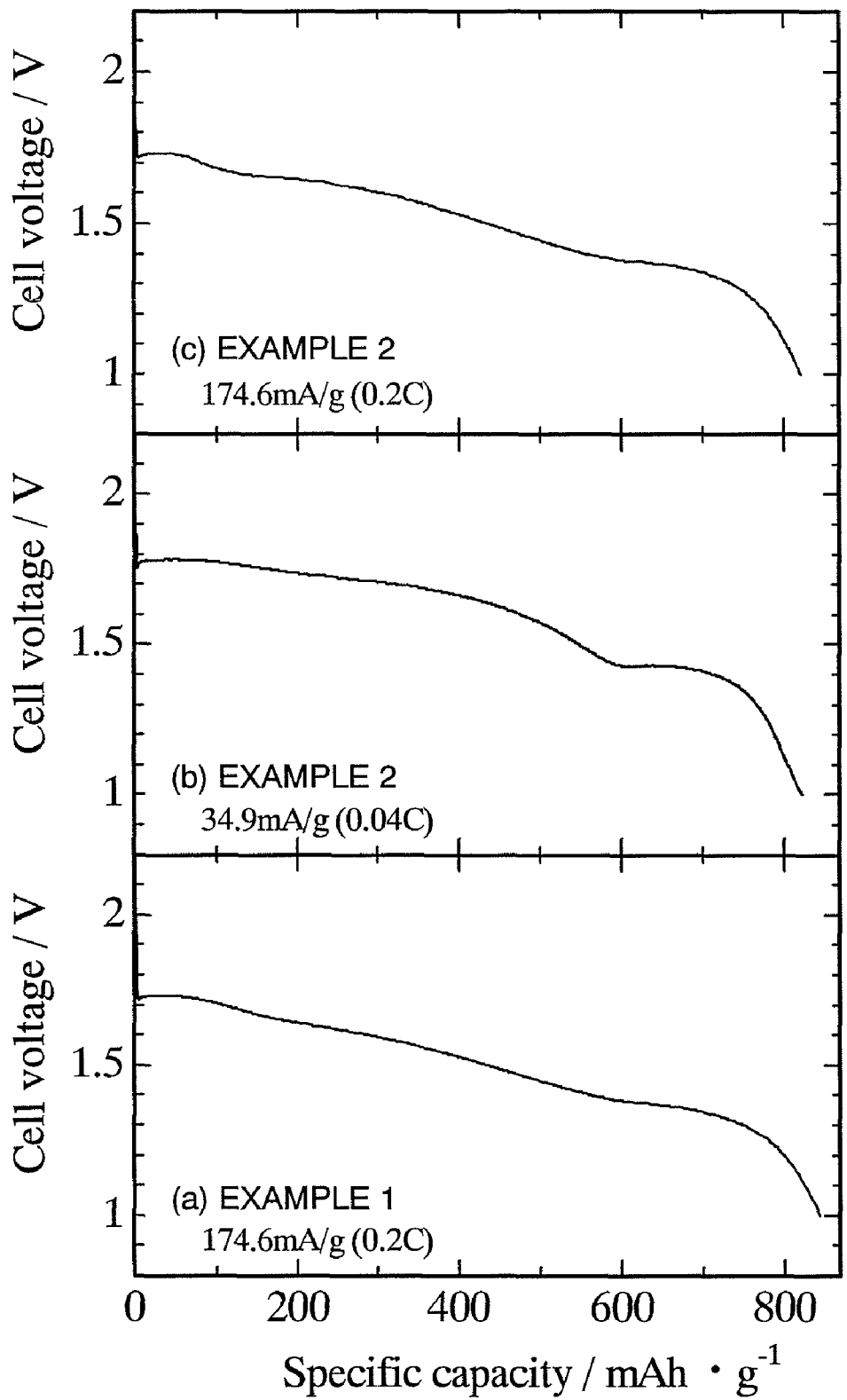
FIG. 5 shows graphs of discharge characteristics of the lithium secondary batteries produced in Example 1 and Example 2.
Figure 6:
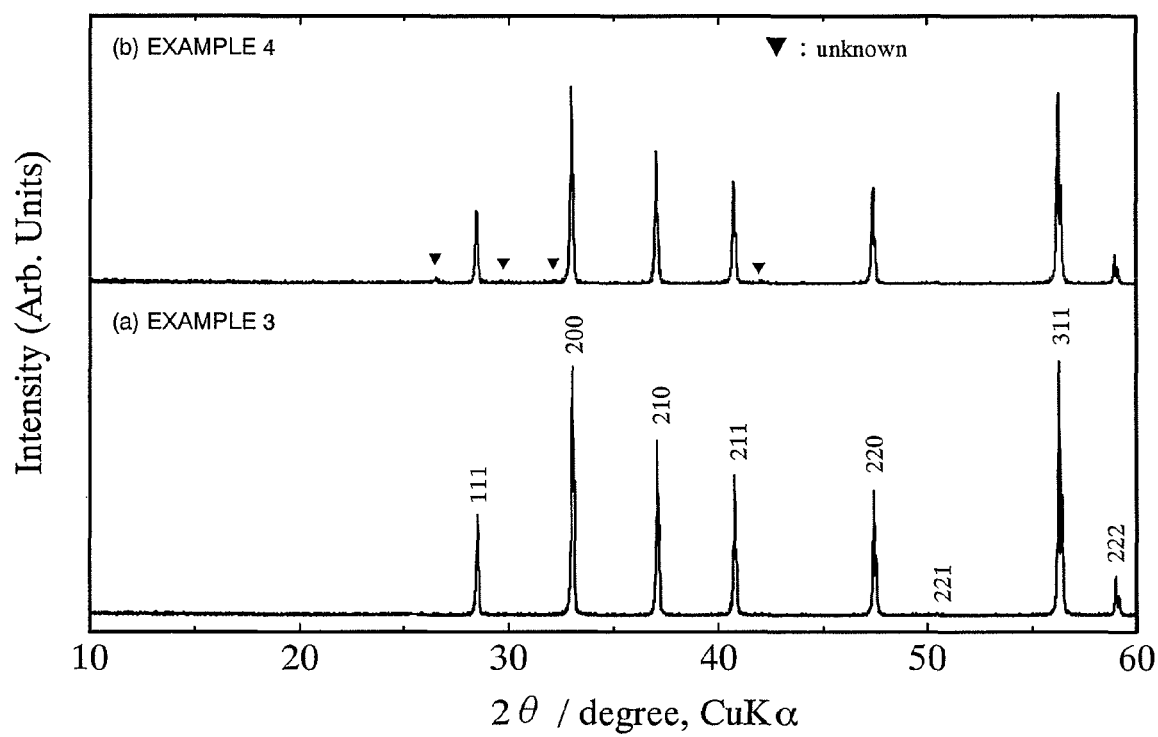
FIG. 6 shows X-ray diffraction patterns of the iron sulfides produced in Example 3 and Example 4.
Figure 7:
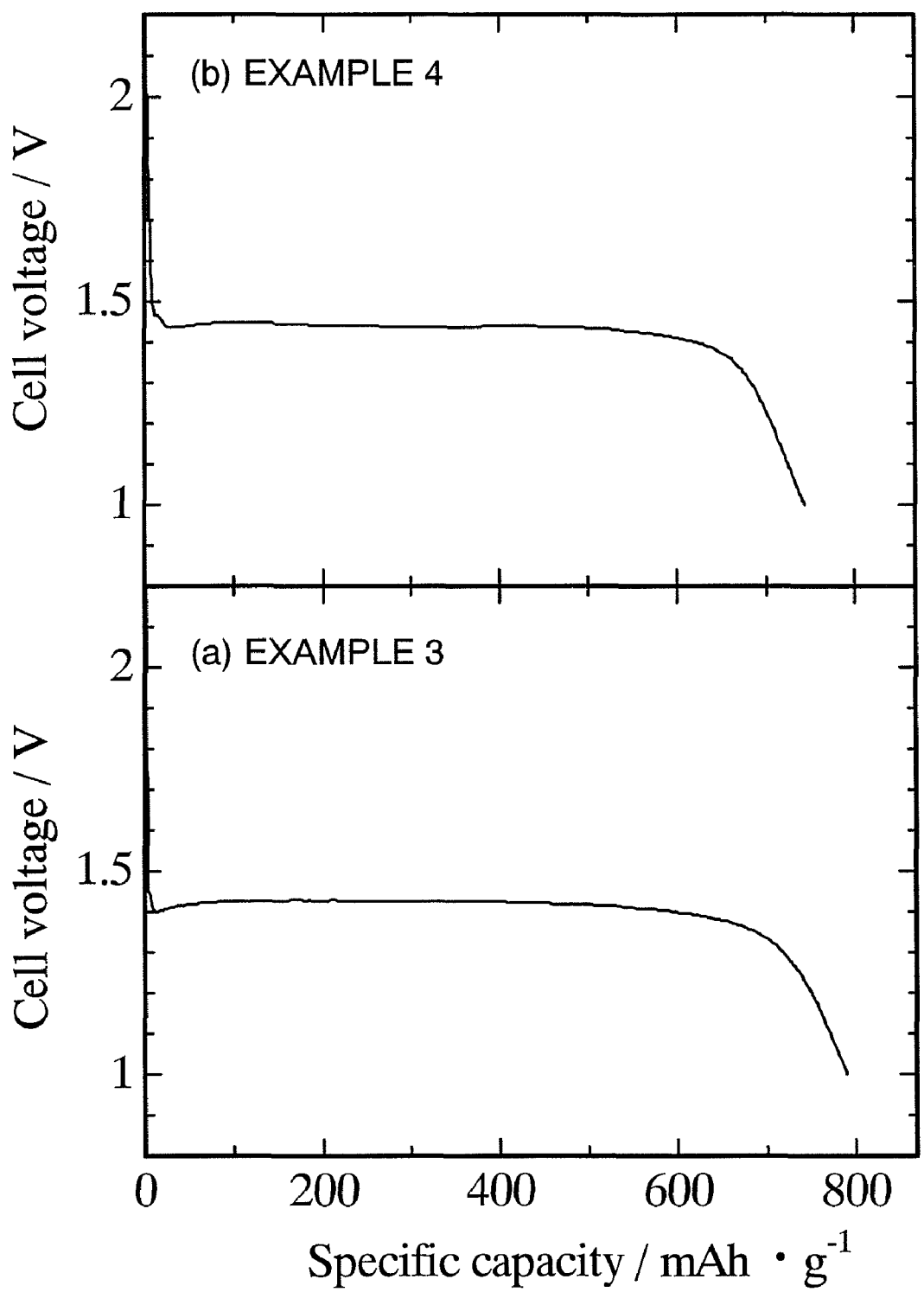
FIG. 7 shows graphs of discharge characteristics of the lithium secondary batteries produced in Example 3 and Example 4.
Figure 8:
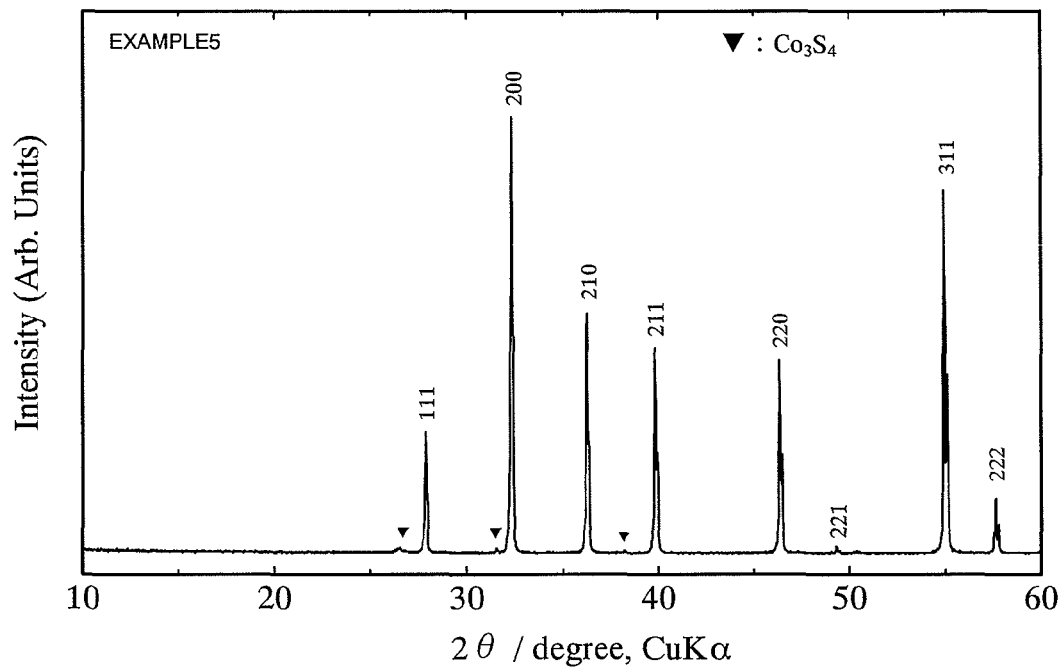
FIG. 8 shows X-ray diffraction patterns of the $CoS_2$ produced in Example 5.
Figure 9:
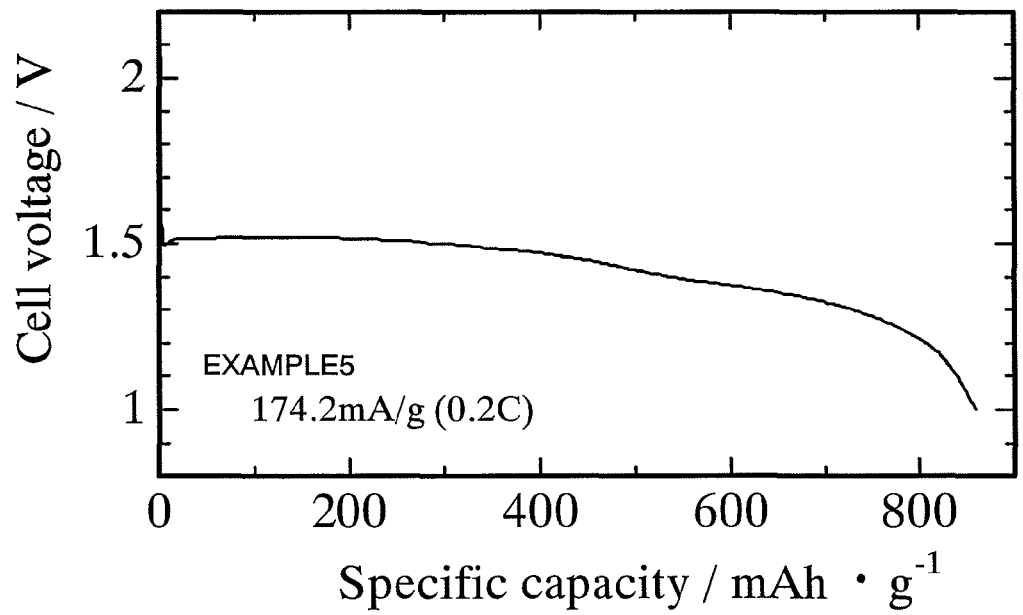
FIG. 9 shows a graph of discharge characteristics of the lithium secondary battery produced in Example 5.

1 Apparatus for electric current application treatment
2 Sample
3 Die (conductive container)
4, 5 Spacer (cover member of the container)
6, 7 Punch electrode
8 Water-cooled vacuum chamber
9 Cooling water passage
10, 16 Water cooling mechanism
11 Pulse current supply
12 Control unit
13 Pressurizing mechanism
14 Position measuring mechanism
15 Atmosphere control mechanism
17 Temperature measuring device

The invention claimed is:

1. A production process of a metal sulfide, comprising placing a metal component and sulfur in a conductive container, and applying a pulsed direct current to the container in a non-oxidizing atmosphere to cause the metal component to react with sulfur.

2. The production process of a metal sulfide according to claim 1, wherein the metal component is Ni, Cu, Fe, Co, or an alloy thereof.

3. The production process of a metal sulfide according to claim 1, wherein the metal component is a porous metal.

4. The production process of a metal sulfide according to claim 3, wherein the metal component is porous nickel or porous nickel alloy.

5. The production process of a metal sulfide according to claim 1, wherein the temperature of the conductive container when a pulsed direct current is applied to the container is from 300° C. to 800° C.

6. A metal sulfide obtained by the process as defined in claim 1, and represented by a composition formula: $MS_x$, wherein M is at least one member selected from the group consisting of Ni, Cu, Fe, and Co, and $1<x\leq2$.

7. The metal sulfide according to claim 6, wherein the metal sulfide is a porous metal sulfide obtained using porous metal as a raw material.

8. A lithium secondary battery positive-electrode material comprising the metal sulfide according to claim 6.

9. A lithium secondary battery, comprising a lithium secondary battery positive-electrode material comprising the metal sulfide according to claim 6.

* * * * *

UNITED STATES PATENT AND TRADEMARK OFFICE
CERTIFICATE OF CORRECTION

PATENT NO.         : 8,361,654 B2
APPLICATION NO.    : 12/674090
DATED              : January 29, 2013
INVENTOR(S)        : Tomonari Takeuchi et al.

It is certified that error appears in the above-identified patent and that said Letters Patent is hereby corrected as shown below:

On the Title page, Item (73):
Change

Item "(73) Assignee: Nat'l Institute of Advanced Industrial Science . . ., (Tokyo, JP)"

To be

Item --(73) Assignee: ~~Nat'l~~ National Institute of Advanced Industrial Science and Technology, (Tokyo, JP)--

Signed and Sealed this
Fifteenth Day of October, 2013

Teresa Stanek Rea
*Deputy Director of the United States Patent and Trademark Office*